United States Patent
Konno et al.

(10) Patent No.: US 8,740,737 B2
(45) Date of Patent: Jun. 3, 2014

(54) TRANSMISSION GUIDE

(75) Inventors: Masahiko Konno, Osaka (JP); Kaori Mori, Osaka (JP); Yuji Kurematsu, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 13/597,383

(22) Filed: Aug. 29, 2012

(65) Prior Publication Data
US 2013/0053197 A1 Feb. 28, 2013

(30) Foreign Application Priority Data
Aug. 31, 2011 (JP) ................................. 2011-188857

(51) Int. Cl.
*F16H 7/08* (2006.01)
*F16H 7/18* (2006.01)

(52) U.S. Cl.
USPC .......................................... 474/140; 474/111

(58) Field of Classification Search
USPC ................................................. 474/111, 140
See application file for complete search history.

(56) References Cited

U.S. PATENT DOCUMENTS

| | | | | |
|---|---|---|---|---|
| 144,144 A * | 10/1873 | Rodgers | .......................... | 474/140 |
| 2,963,918 A * | 12/1960 | Blakstad | ........................ | 474/111 |
| 3,139,655 A * | 7/1964 | Cooper et al. | ................. | 164/254 |
| 4,832,664 A * | 5/1989 | Groger et al. | .................. | 474/111 |
| 5,813,935 A * | 9/1998 | Dembosky et al. | ........... | 474/111 |
| 6,036,613 A * | 3/2000 | Diehm | .......................... | 474/111 |
| 6,554,728 B2 * | 4/2003 | Young et al. | ................... | 474/140 |
| 6,939,259 B2 * | 9/2005 | Thomas et al. | ................ | 474/111 |
| 2002/0042316 A1 * | 4/2002 | Young et al. | ................... | 474/140 |
| 2002/0193192 A1 * | 12/2002 | Inoue et al. | .................... | 474/111 |
| 2005/0079938 A1 | 4/2005 | Hashimoto et al. | | |
| 2009/0105023 A1 * | 4/2009 | Oota et al. | ..................... | 474/111 |

FOREIGN PATENT DOCUMENTS

| | | | |
|---|---|---|---|
| JP | 2004-150615 A | 5/2004 | |
| JP | 2005-114126 A | 4/2005 | |

OTHER PUBLICATIONS

Unpublished U.S. Appl. No. 13/558,994 Transmission Guide.
Unpublished U.S. Appl. No. 13/600,994 Transmission Guide.

* cited by examiner

*Primary Examiner* — William A Rivera
*Assistant Examiner* — Henry Liu
(74) *Attorney, Agent, or Firm* — Howson & Howson LLP

(57) ABSTRACT

In a transmission guide, a synthetic resin shoe and a synthetic resin base are integrally molded by two part molding. Strips projecting from a supporting surface of the base extend in parallel to the longitudinal direction of the base, and concave grooves formed in the shoe, which also extend in parallel to the longitudinal direction of the base and of the shoe, receive the strips of the base and are fused with the base.

5 Claims, 12 Drawing Sheets

TRANSMISSION GUIDE

CROSS REFERENCE TO RELATED APPLICATIONS

This application claims priority based on Japanese Patent Application No. 2011-188857, filed Aug. 31, 2011. The disclosure of Japanese Patent Application No. 2011-188857 is herein incorporated by reference.

FIELD OF THE INVENTION

This invention relates to a transmission guide for use as a stationary guide for guiding a traveling transmission chain, or as a movable guide for applying tension to, and guiding, the chain. A transmission incorporating the guide described herein can be used in an automobile engine, for example, to transmit power by means of an endless roller chain or a silent chain engaged with a driving sprocket and one or more driven sprockets.

BACKGROUND OF THE INVENTION

FIGS. 19A, 19B and 20 show a conventional transmission guide 800 for use in a transmission of an automobile engine. The guide comprises a shoe 810 on which a transmission chain slides, and a separately molded base 820 for supporting, and maintaining the configuration of, the shoe 810. The shoe 810 is formed with hooks 813, which can be provided on both sides of the shoe 810, and the base 820 is cut away to form hook-receiving notches 823. The shoe 810 and the base 820 are assembled twisting the shoe, and engaging the hooks 813 with the notches 813 as described in laid-open Japanese Patent Application No. 2005-114126.

In another known chain guide, disclosed in laid-open Japanese Patent Application No. 2004-150615, the back surface of a synthetic resin shoe is fused to the front surface of a base composed of another synthetic resin.

In the operation of the transmission guide 800 in FIGS. 19A-20, vibration due to load variations cause the shoe 810 to move longitudinally through a distance corresponding to the margin allowed for assembly, as indicated by an arrow in FIG. 19B. Therefore, the hook 813 of the shoe 810 locally abuts an end of the notch 823 of the base 820, causing an excessive concentration of stress in the hook 813. The excessive stress can result in breakage of the hook, separation of the shoe from the base, and failure of the guide to maintain proper travel of the transmission chain.

On the other hand, in the case of a chain guide in which the back of a synthetic resin shoe is fused to the base, it is difficult to maintain the bond between the shoe and the base over a long time, and a shearing force in the direction of the width of the base can cause the shoe to separate from the base.

There is a need for a transmission guide that does not require the engagement of hooks and notches so that it can be more easily assembled, and that is also less subject to failure as a result of breakage of a bond between a synthetic resin shoe and a synthetic resin base, so that trouble-free operation of the guide can be assured over a long time.

SUMMARY OF THE INVENTION

The transmission guide in accordance with the invention is designed for sliding engagement with a traveling transmission chain comprising link plates. The guide comprises an elongated synthetic resin shoe having a front surface on which the link plates can slide, and a back surface. The guide also comprises a synthetic resin base for supporting the shoe. The base is elongated along the direction of elongation of the shoe and has a supporting surface engaged with the back surface of the shoe.

The shoe and base are integrally molded by two member molding. Strips project from the supporting surface of the synthetic resin base and extend in parallel in the direction of elongation of the base. Concave grooves formed in the back surface of the synthetic resin shoe extend in parallel to the direction of elongation of the shoe, and each of the projecting strips of the base is received in, and fused to, one of the concave grooves formed in the back surface of the shoe.

Manufacture of the above-described guide can be carried out without encountering the problems that arise when the synthetic resin shoe and the synthetic resin base are molded separately. Moreover, the cooperating projecting strips and concave grooves increase the area over which the shoe and the base are joined together, resisting shearing forces acting in the direction of the width of the guide, and increasing the effectiveness of the bond between the shoe and the base. The fusion of the shoe to the base reduces wear and damage to the shoe, and results in a more durable guide that can operate effectively for a long time.

According to a second aspect of the invention, at least one of the concave grooves in the synthetic resin shoe and a projecting strip received therein, are positioned directly opposite a location on the front surface of the shoe on which a link plate of a transmission chain can slide.

This arrangement assures stable chain travel. Even if heat generated when the transmission chain travels on the synthetic resin shoe causes the temperature of the synthetic resin shoe to rise to a high level, the projecting strip of the synthetic resin base engages and the concave groove of the shoe, supporting the shoe and preventing the shoe from being deformed as a result of softening.

According to a third aspect of the invention, at least one of the concave grooves of the synthetic resin shoe and the projecting strip of the synthetic resin base received therein gradually widen in the direction of advancing movement of a transmission chain in sliding engagement with the shoe.

With this arrangement, when the shoe is subjected to a shearing force in the direction in which the transmission chain advances, the widening of the projecting strip and the resistance caused by the shape of the engagement projecting strip suppresses the shearing force. Accordingly, the bond between the shoe and the base is improved.

According to a fourth aspect of the invention, at least one of the projecting strips on the base, and the concave groove of the shoe receiving said at least one of said projecting strips are each composed of a repeating series of parts each of which gradually widens in the direction of advancing movement of a transmission chain in sliding engagement with the shoe.

With this arrangement, a shearing force acting on the shoe in the direction in which the chain advances is resisted by the multiple, gradually widening parts. Accordingly, it is possible to maintain the bond of the synthetic resin shoe with the synthetic resin base in the guide for a long time.

In accordance with a fifth aspect of the invention, at least one of the concave grooves in the synthetic resin shoe and the projecting strip received therein gradually widens in one direction along the direction of elongation of the shoe, and another of said the concave grooves in the synthetic resin shoe and the projecting strip received therein gradually widens in the opposite direction along the direction of elongation of the shoe.

With this arrangement, shearing forces in both directions along the longitudinal direction of the guide are resisted.

Accordingly, it is possible to maintain the bond between the synthetic resin shoe and the synthetic resin base for a long time.

In accordance with a sixth aspect of the invention, at least one projecting strip of the synthetic resin base has an undercut shape in section, and the concave groove of the synthetic resin shoe in which said at least one projecting strip is received also has a shape in section conforming to the undercut shape of the projecting strip.

With this arrangement, the projecting strip having the undercut shape engages the concave groove having a conforming undercut shape and the synthetic resin shoe is prevented from separating from the base. Accordingly, it is possible to avoid detachment of the back surface of the synthetic resin shoe from the supporting surface of the synthetic resin base.

According to a seventh aspect of the invention, the concave grooves of the shoe and the projecting strips of the base have wedge-shaped, tapered, transverse cross-sections.

With this arrangement, it is possible to improve release in the primary injection molding step, and to remove the element formed in the primary injection molding step readily from the primary cavity. As a result it is also possible to improve molding accuracy.

DETAILED DESCRIPTION OF THE PREFERRED EMBODIMENTS

Figure 1:
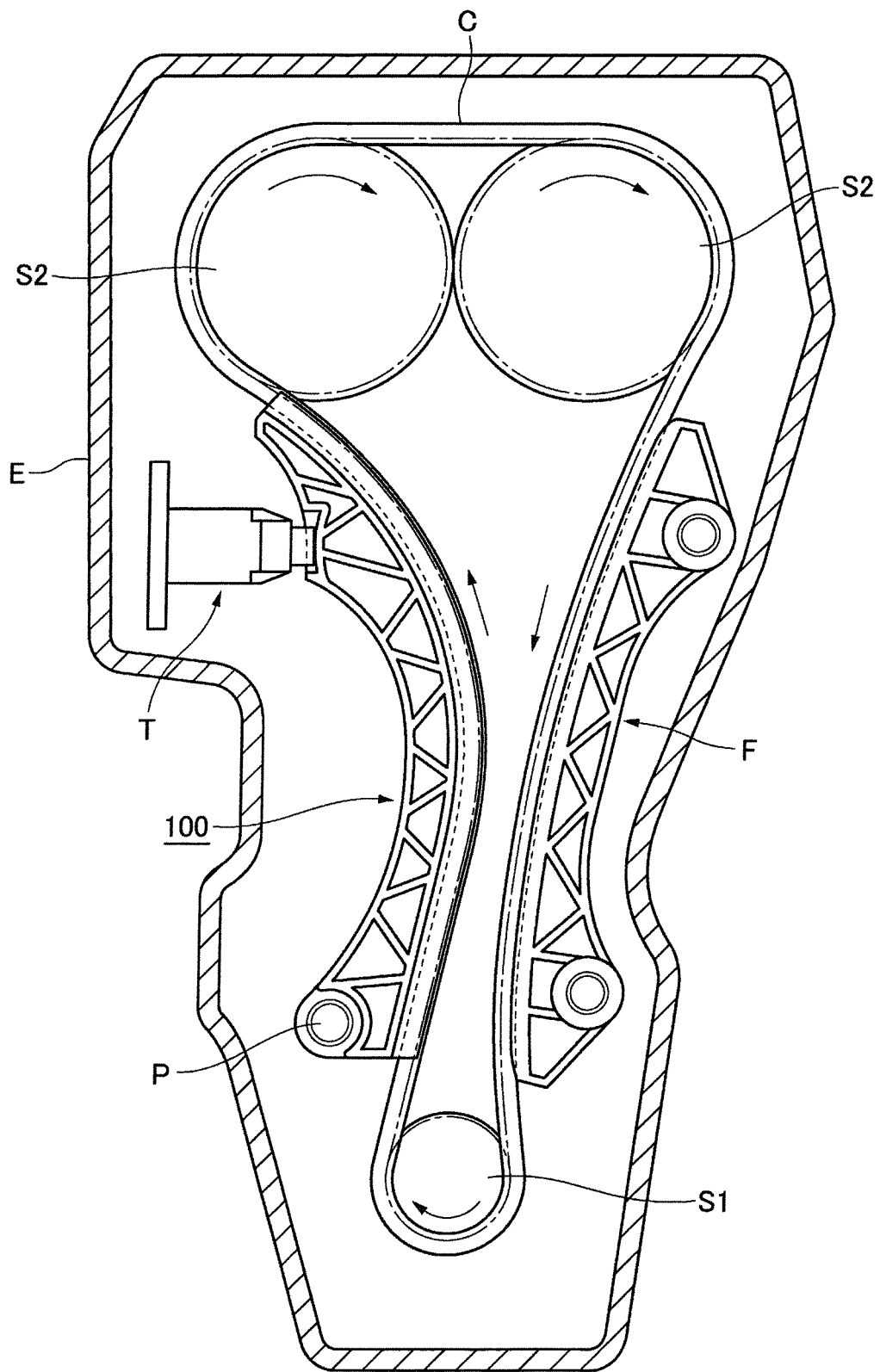
FIG. 1 is a schematic front elevational view of the timing drive of a DOHC (dual overhead cam) internal combustion engine, incorporating a transmission guide according to the invention.

As shown in FIG. 1, a transmission guide 100 is incorporated into the timing drive of a dual overhead cam (DOHC) internal combustion engine E, in which a transmission chain C is engaged with and driven by a crankshaft sprocket S1, and in driving relationship with a pair of camshaft sprockets S2. The chain C can be a roller chain. The guide 100 is a movable guide pivoted on a shoulder bolt P, and in sliding engagement with a span of the chain that travels from the crankshaft sprocket toward the camshaft sprockets.

A tensioner T exerts a force against the guide 100, urging the guide in a direction to maintain tension in the chain, preventing excessive looseness of the chain and at the same time avoiding excessive tension. A stationary guide F, fixed to the engine block, guides the span of the transmission chain that travels from the camshaft sprockets toward the crankshaft sprocket.

Figure 2:
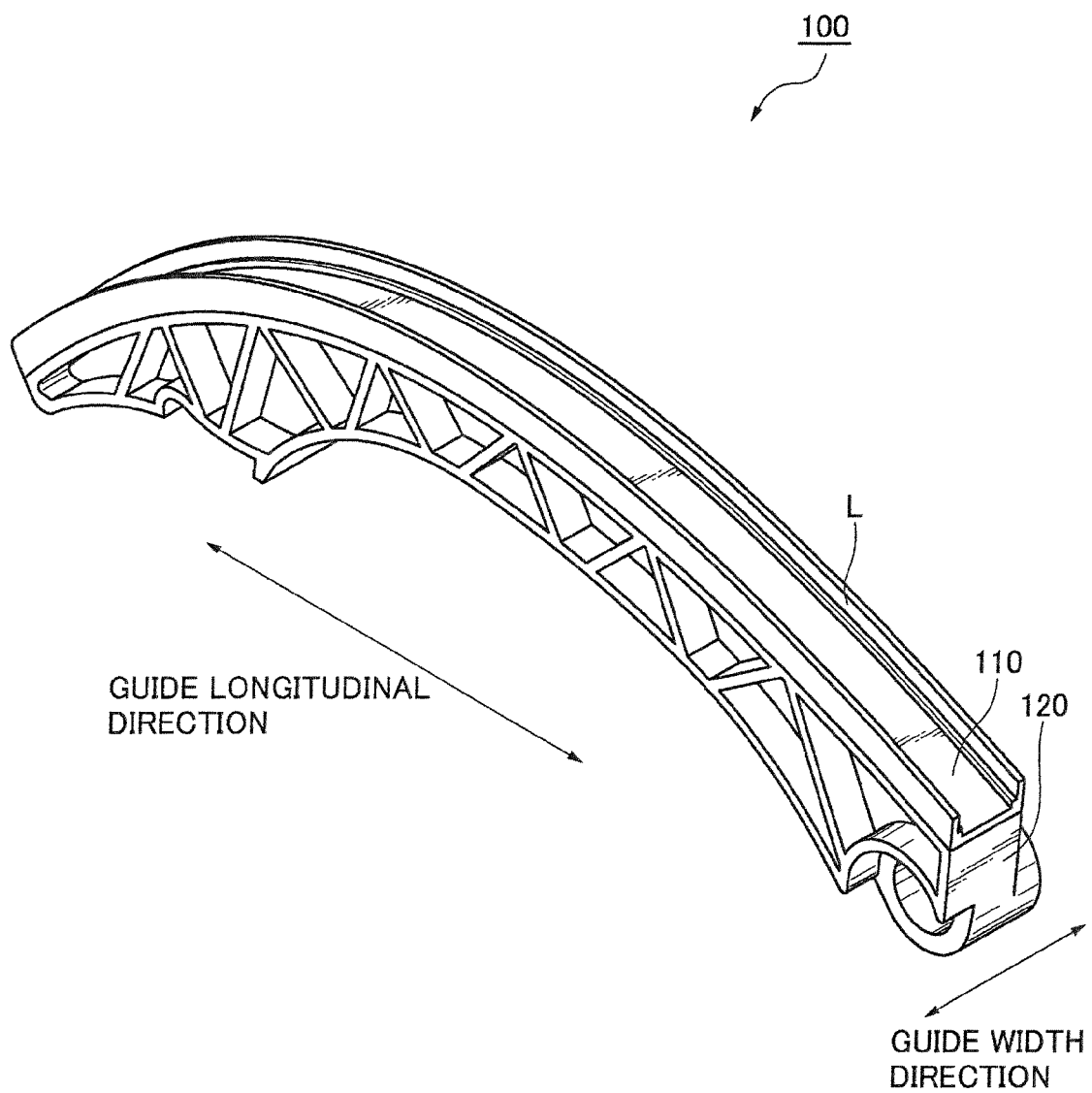
FIG. 2 is a perspective view of the transmission guide.
Figure 3:
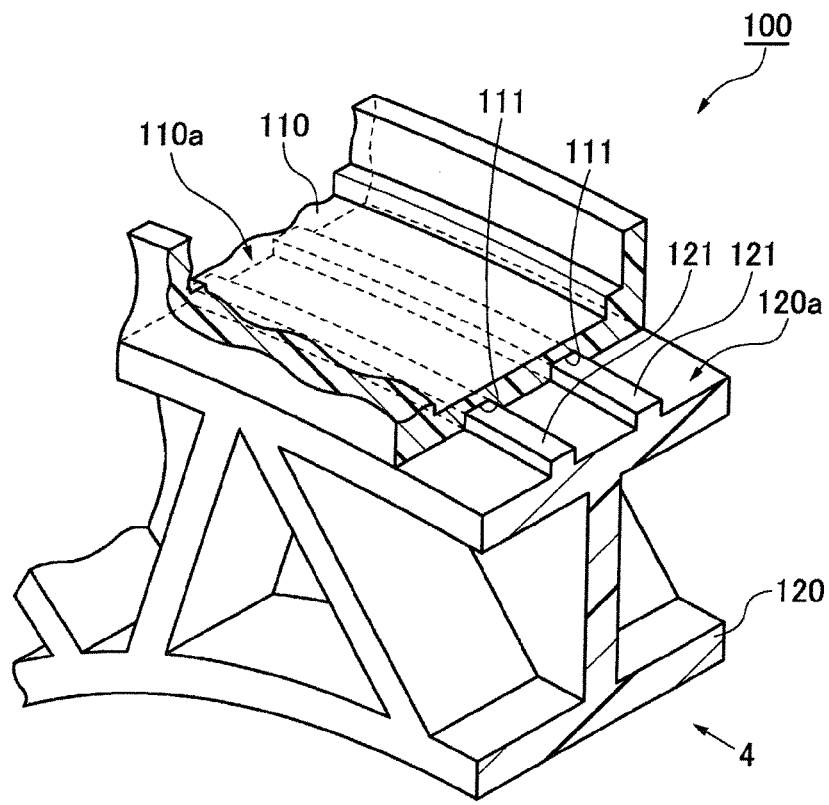
FIG. 3 is fragmentary perspective view of the transmission guide, illustrating the relationship between the base and the shoe.
Figure 4:
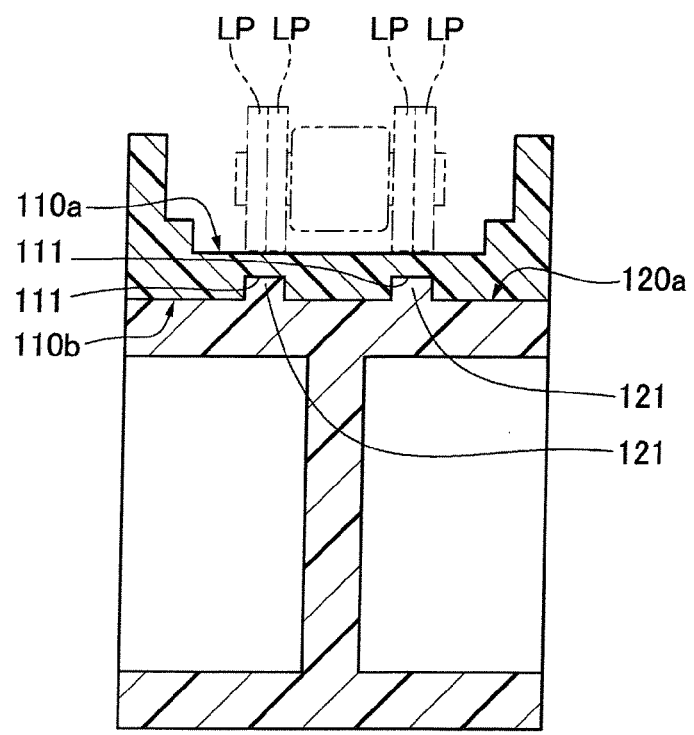
FIG. 4 is cross-sectional view of the transmission guide as seen along the direction of arrow 4 in FIG. 3.
Figure 5:
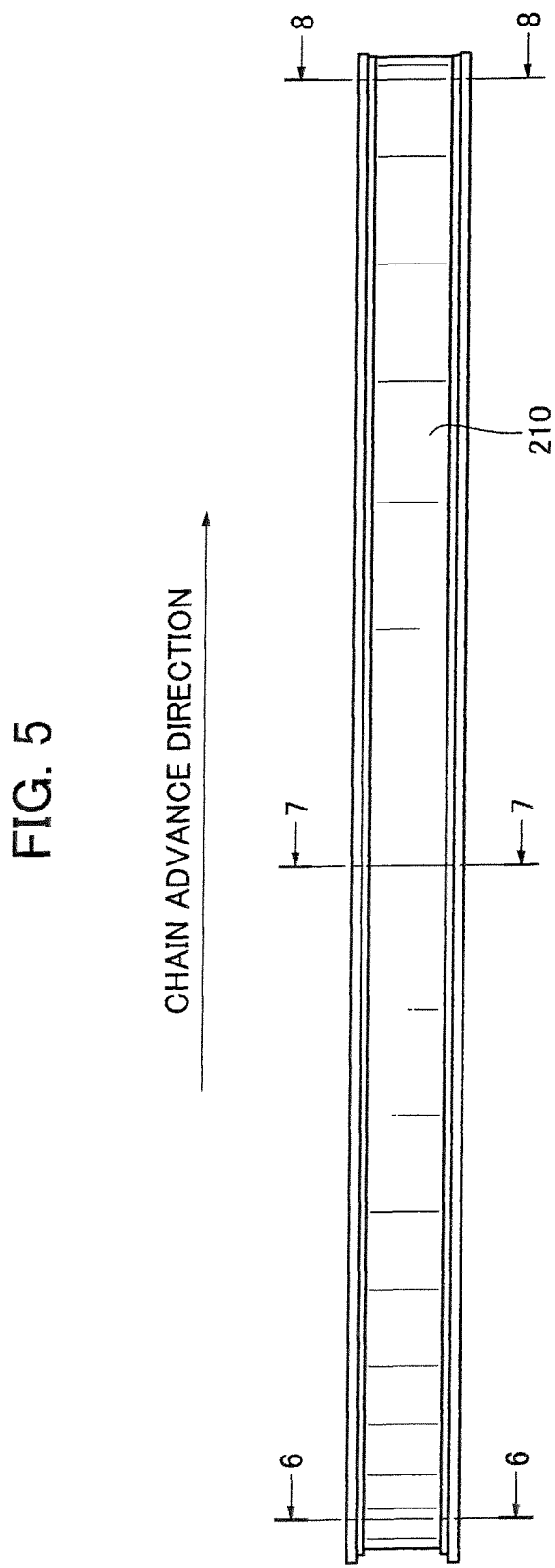
FIG. 5 is an elevational view of the sliding contact surface of the shoe of a transmission guide according to a second embodiment of the invention.
Figure 6:
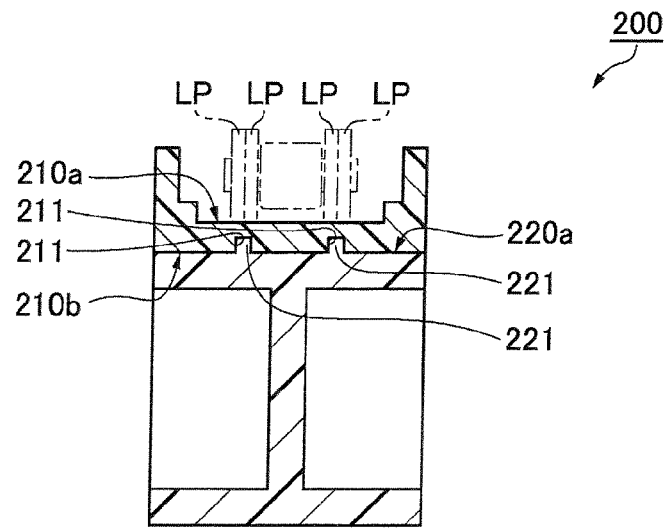
FIG. 6 is a cross-sectional view of the transmission guide of FIG. 5, taken on section plane 6-6 in FIG. 5.
Figure 7:
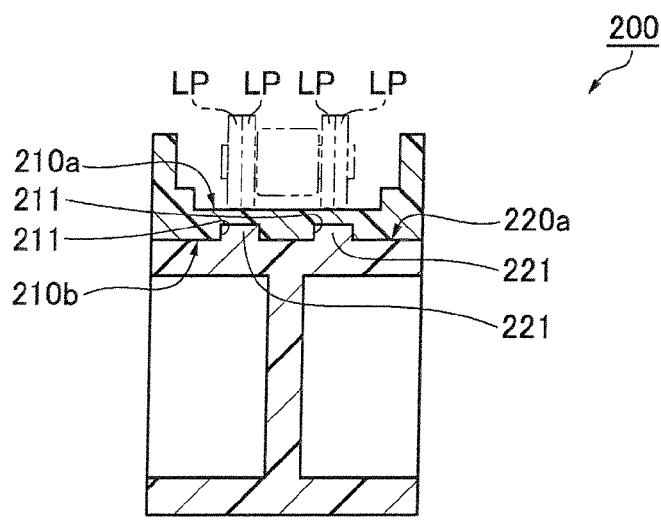
FIG. 7 is a cross-sectional view of the transmission guide of FIG. 5, taken on section plane 7-7 in FIG. 5.
Figure 8:
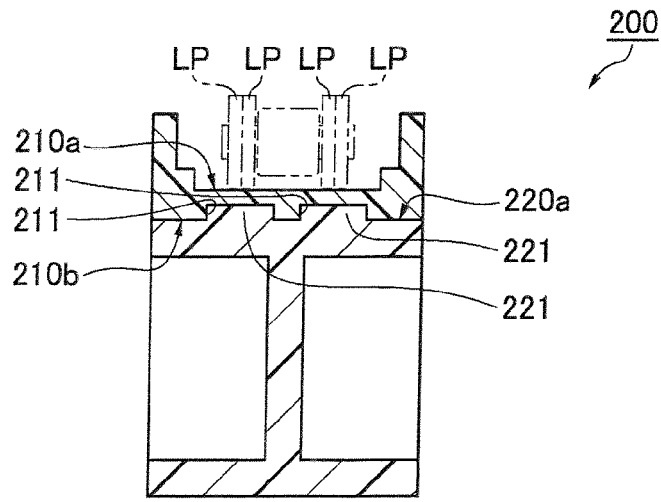
FIG. 8 is a cross-sectional view of the transmission guide of FIG. 5, taken on section plane 8-8 in FIG. 5.

As shown in FIGS. 2-4, the movable guide 100 is assembled by integrally molding, by "two member" molding, a synthetic resin shoe 110 with a synthetic resin base 120. The shoe can be made of polyamide resin, and has a sliding contact surface 110a (FIGS. 3 and 4) on which the link plates LP of the transmission chain C slide in the longitudinal direction of the guide as shown in FIG. 4. The base 120 can be made of a reinforced polyamide resin containing glass fibers. The base extends along the longitudinal direction of the shoe, and supports the back surface 110b of the shoe.

The guide is made by first molding the synthetic resin base 120 made of the reinforced polyamide resin containing glass fibers, and thereafter molding the synthetic resin shoe 110 made of polyamide resin by secondary injection molding, whereby, the shoe 110 is integrated with the base 120.

As shown in FIG. 2, side walls L are formed at the side edges of the shoe, and extend along the longitudinal direction of the guide to limit lateral movement of the transmission chain.

As shown in FIGS. 3 and 4, two strips 121 project from a supporting surface 120a of the synthetic resin base 120, and extend in parallel relationship along the longitudinal direction of the guide.

As shown in FIG. 4, concave grooves 111 of the synthetic resin shoe 110 receive the strips 121 of the base 120. In the injection molding process, the strips 121 are fused to the walls of the grooves 111 in the two member molding process.

Advantages of the arrangement illustrated in FIGS. 2-4 over the conventional arrangement in which a flat back surface of a synthetic resin shoe is opposed to a flat supporting surface of a synthetic resin base, include the fact that the increased contact area increases the bonding force acting between the shoe and the base, and the fact that the arrangement of FIGS. 2-4 affords a greater resistance to shearing forces acting in the direction of the width of the guide.

As shown in FIG. 4, the concave grooves 111 of the synthetic resin shoe 110 and the projecting strips 121 of the synthetic resin base 120 are directly opposed to the link plates LP of the chain. Even though heat is generated as the transmission chain C slides against the synthetic resin shoe 110, causing the temperature of the shoe to rise, the strips 121 of the base 120 support the grooves 111 of the shoe 110 and prevent the shoe from being softened and deformed, ensuring that the link plates LP of the transmission chain C are adequately supported.

The concave/convex relationship of the strips 121 and the grooves 111 ensure that the shoe 110 is strongly fused to the base 120, thereby preventing wear and damage to the shoe, and maintaining the chain in its path of travel over a long time. The cooperation of the strips and grooves also increases the bonding that resists lateral forces acting on the shoe and base.

The directly opposed relationship of the link plates of the chain to the grooves in the shoe and the projecting strips of the base ensures stable chain travel In the embodiment shown in FIGS. 5-8, the movable guide 200 is basically the same as the guide 100 of the previously described embodiment, except for the configurations of the concave grooves and the projecting strips. In this embodiment, the grooves 211 of the synthetic resin shoe 210 and the projecting strips 221 of the synthetic resin base 220 are gradually widened in the advancing direction of the transmission chain C. The gradual widening of the strips and grooves causes the shoe 210 to resist a shearing force acting in the direction of advancing movement of the chain. Additionally, the gradual widening of the grooves and the projecting strips in the advancing direction of the chain improves the bonding strength of the shoe and the base.

Figure 9A:
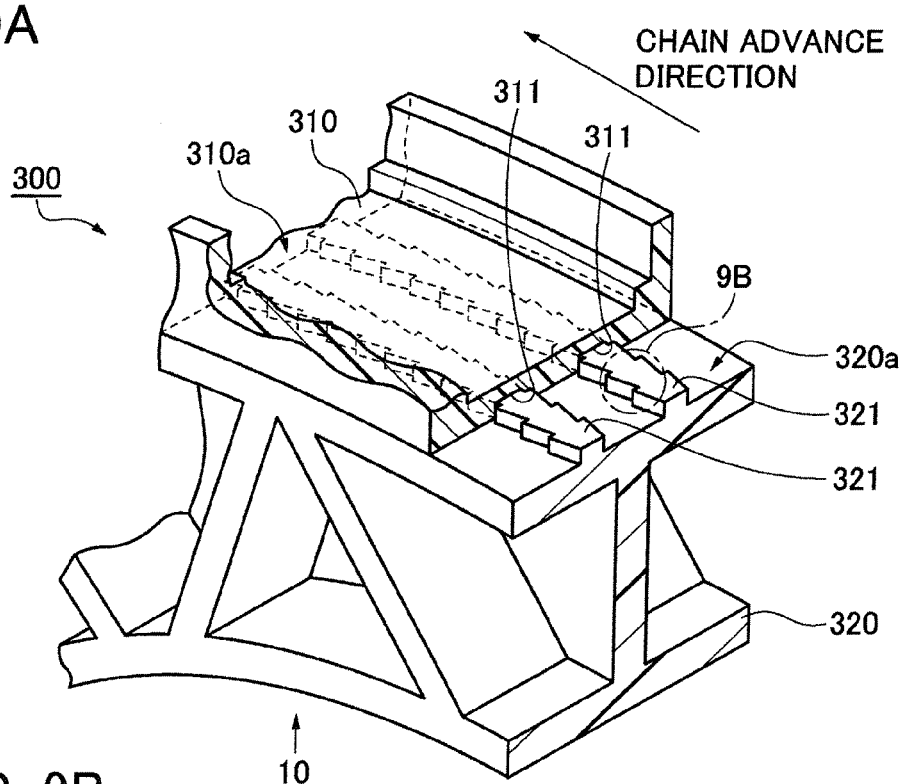
FIG. 9A is fragmentary perspective view of the transmission guide in accordance with a third embodiment of the invention, illustrating the relationship between the base and the shoe.
Figure 9B:
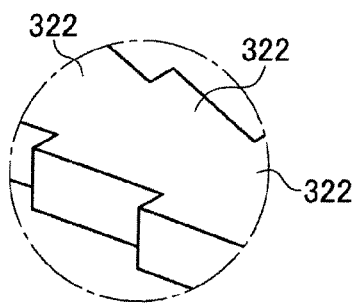
FIG. 9B is an enlargement of a part of the transmission guide shown in FIG. 9A.
Figure 10:
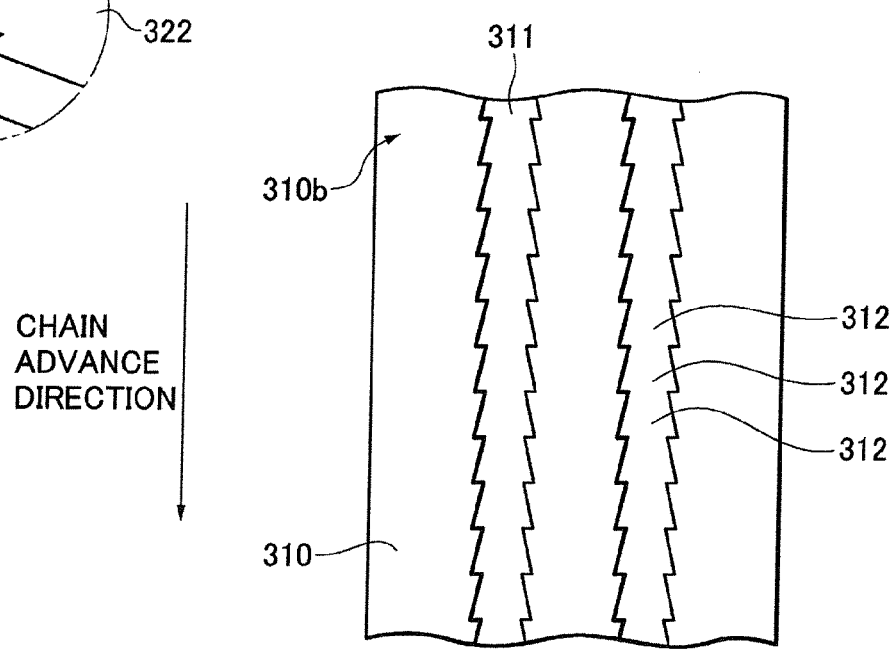
FIG. 10 is a fragmentary elevational view of the back side of the shoe of the transmission guide, as seen along the direction of arrow 10 in FIG. 9A.
Figure 11:
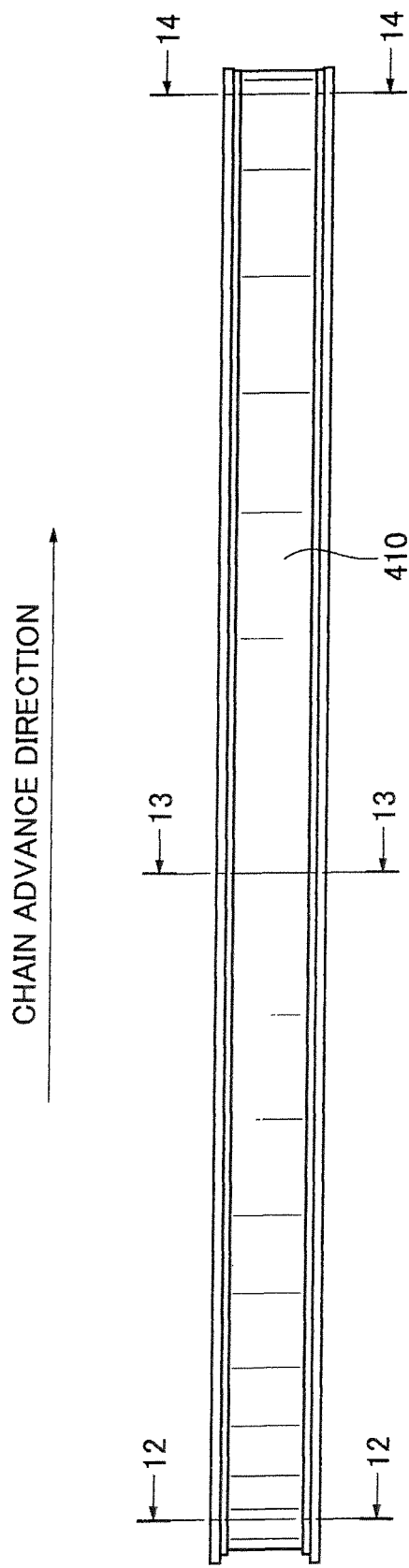
FIG. 11 is an elevational view of the sliding contact surface of the shoe of a transmission guide according to a fourth embodiment of the invention.

In a third embodiment, shown in FIGS. 9A, 9B and 10, the guide is basically the same as the guide of the first embodiment, except for the configurations of the concave groove and the projecting strip. As shown in FIG. 9A, the projecting strip 321 of the synthetic resin base 320 is composed of a series of identical parts 322 which are repeated along the longitudinal direction of the guide. Each of these parts gradually widens in the direction of advancing movement of the transmission chain.

As shown in FIG. 10, the concave groove 311 of the synthetic resin shoe 310 is composed of a series of identical parts 312 which are repeated along the longitudinal direction of the guide. Each of these parts also gradually widens in the direction of advancing movement of the transmission chain.

Because of the repeating series of gradually widening parts in the projecting strip and the concave groove, resistance caused by the cooperation of the multiple repeating parts of the concave groove 311 with the multiple repeating parts of the projecting strip suppresses longitudinal shearing forces acting on the shoe. In addition, the configurations of the projecting strip and the concave groove provide a more effective and durable bond between shoe 310 and the base 320.

In a fourth embodiment, illustrated in FIGS. 11-14, the guide 400 is basically similar to the guide of the first embodiment except for the configurations of the concave grooves and the projecting strips. One of the two parallel concave grooves 411 in the synthetic resin shoe 410, and the projecting strip 421 of the synthetic resin base 420 that fits into said groove, gradually widen, proceeding in the direction of advancing movement of the chain, while the other groove 411 and the other projecting strip gradually become narrower, proceeding in the direction of advancing movement of the chain.

Figure 12:
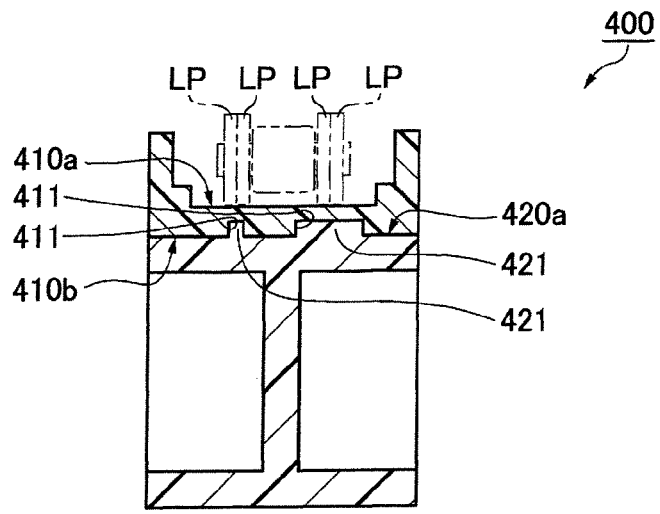
FIG. 12 is a cross-sectional view of the transmission guide of FIG. 11, taken on section plane 12-12 in FIG. 11.
Figure 13:
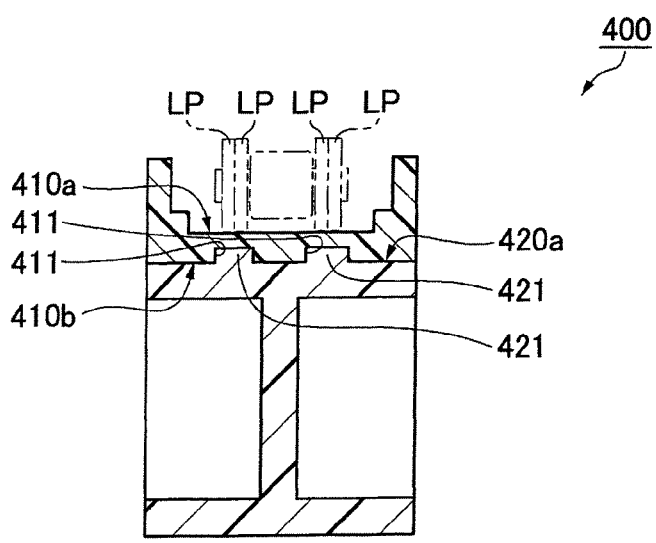
FIG. 13 is a cross-sectional view of the transmission guide of FIG. 12, taken on section plane 13-13 in FIG. 11.
Figure 14:
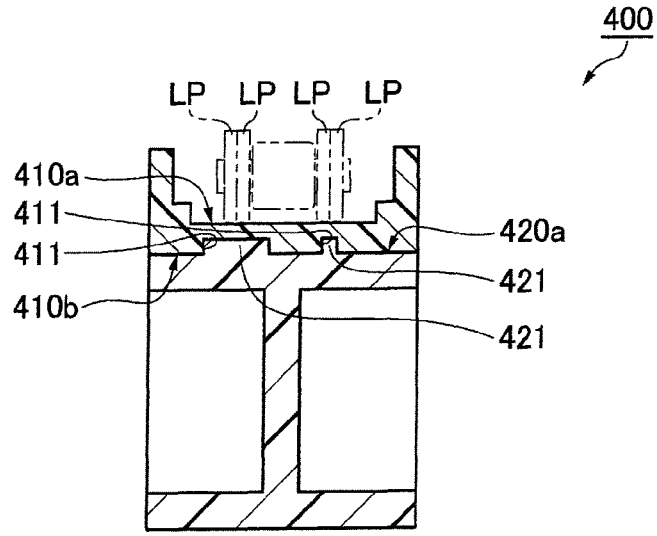
FIG. 14 is a cross-sectional view of the transmission guide of FIG. 11, taken on section plane 14-14 in FIG. 11.

The cooperation of one of the grooves and projecting strips on the left side of FIGS. 12-14 suppresses shearing forces acting on the shoe in the direction of chain advancement, while the cooperation of the other groove and projecting strip suppresses shearing forces acting on the shoe in the direction opposite to the direction of chain advancement.

In the fourth embodiment, as in the other embodiments, the cooperation of the projecting strips and concave grooves improves the durability of the bond between the shoe and the supporting base.

Figure 15:
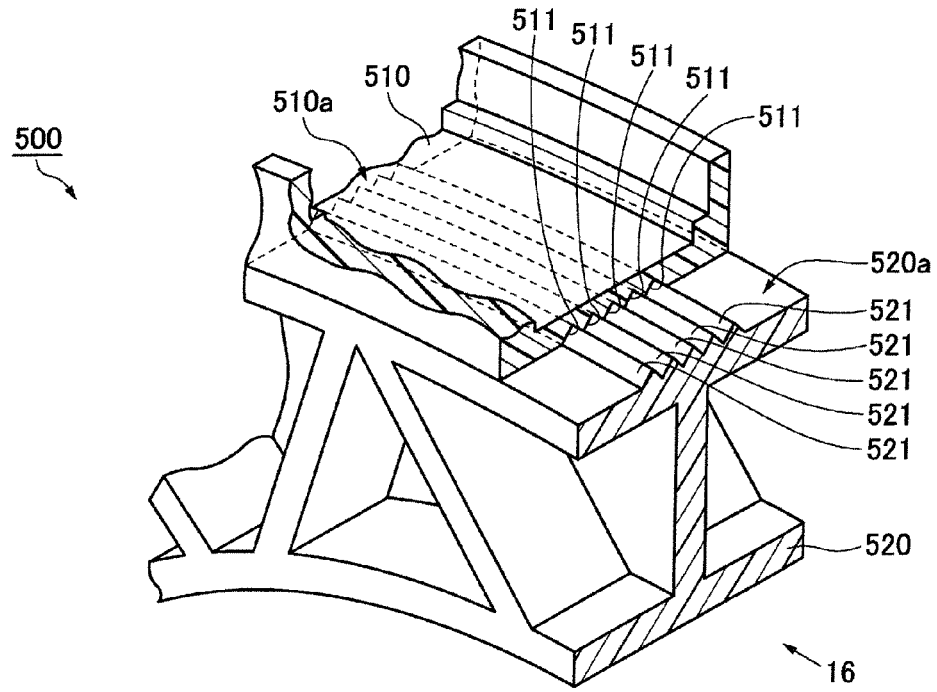
FIG. 15 is fragmentary perspective view of the transmission guide in accordance with a fifth embodiment of the invention, illustrating the relationship between the base and the shoe.
Figure 16:
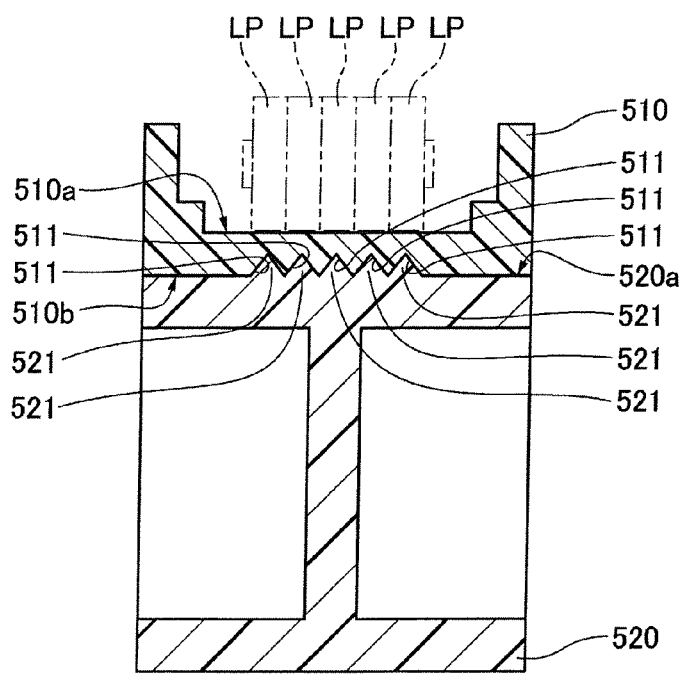
FIG. 16 is cross-sectional view of the transmission guide as seen along the direction of arrow 16 in FIG. 15.

In a fifth embodiment, illustrated in FIGS. 15 and 16, plural, parallel, wedge-shaped, concave grooves 511 formed on the on the back of a synthetic resin shoe 510 receive wedge-shaped projecting strips 521 on a synthetic resin base 520. The grooves are shaped to conform to the projecting strips so that the grooves and projecting strips can be fused together. The wedge-shaped grooves and projecting strips allow for improved releasability of the shoe or base from a primary injection mold.

In the particular embodiment shown in FIGS. 15 and 16, five concave grooves 511 are provided on the back of the shoe opposite from the area in which a chain contacts the front surface of the shoe. For example, as shown in FIG. 16, where a silent chain having five link plates LP across its width is in sliding engagement with the front surface of the shoe, each of the link plates is directly opposite one of the grooves on the back surface of the shoe.

When the chain generates heat as it slides along the front face of the shoe 510, and the temperature of the shoe rises, the projecting strips 521 of the synthetic resin base 520 securely support the link plates LP of the transmission chain C. Accordingly, in addition to the effects of the movable guide of the first embodiment, the movable guide 500 of the fifth embodiment affords improves molding accuracy and secure stable chain travel.

Figure 17:
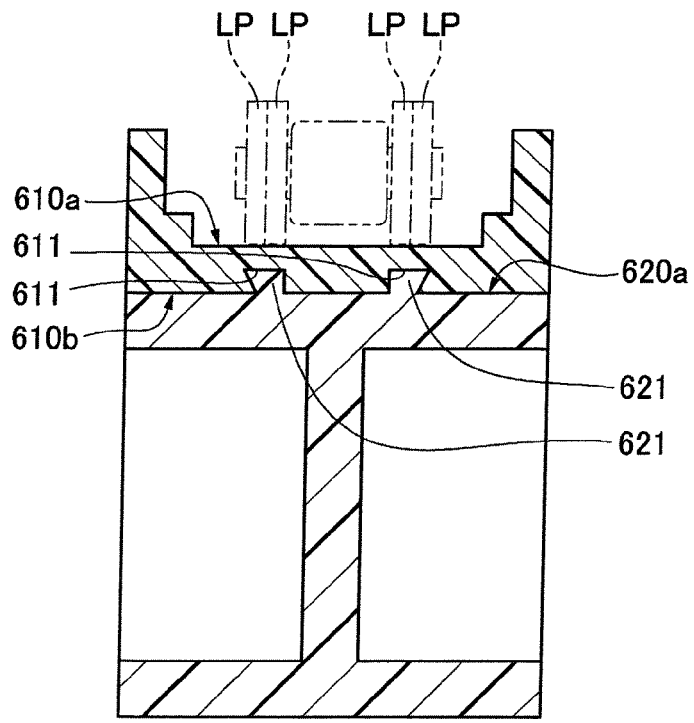
FIG. 17 is a transverse cross-sectional of a transmission guide according to a sixth embodiment of the invention.

In a sixth embodiment of the invention, illustrated in FIG. 17, the configuration is substantially the same as that of the first embodiment, except that each of the projecting strips 621 of the synthetic resin base 620 has a dovetail shape, i.e., a cross-section in which the width of each strip increases, proceeding from the base toward the shoe. The cross-sectional shape is asymmetric in that the inner, opposed faces of the strips are perpendicular to the base, whereas the outer faces of the strips flare outward in a direction toward the edges of the base.

The concave grooves 611 of the synthetic resin shoe 610 also have dovetail grooves that conform to, and receive, the respective projecting strips 621. The dovetail shape of the strips and grooves helps to prevent the synthetic resin shoe 610 from separating from the synthetic resin base. Accordingly, in addition to the effects of the movable guide of the first embodiment, the movable guide of the sixth embodiment more effectively avoids detachment of the back surface 610b of the synthetic resin shoe from the supporting surface 620a of the synthetic resin base.

Figure 18:
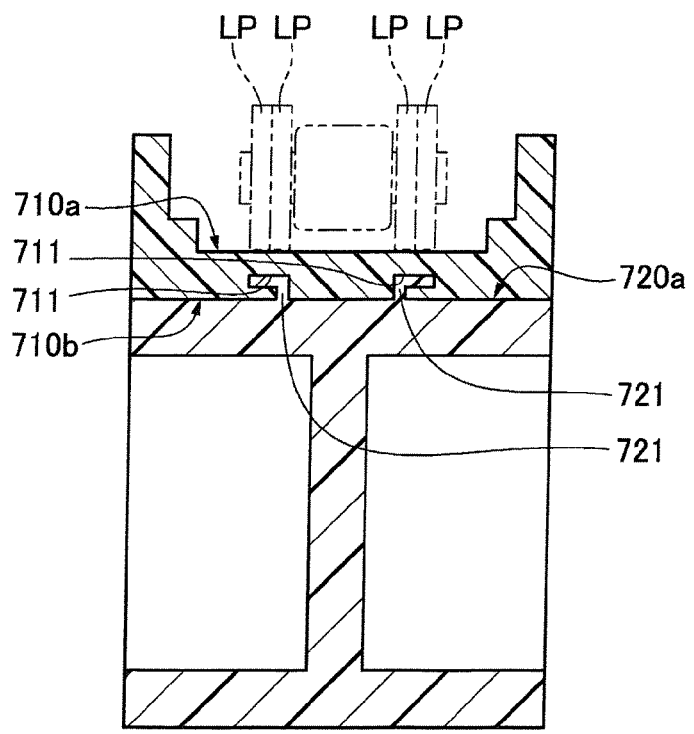
FIG. 18 is a transverse cross-sectional of a transmission guide according to a seventh embodiment of the invention.
Figure 19A:
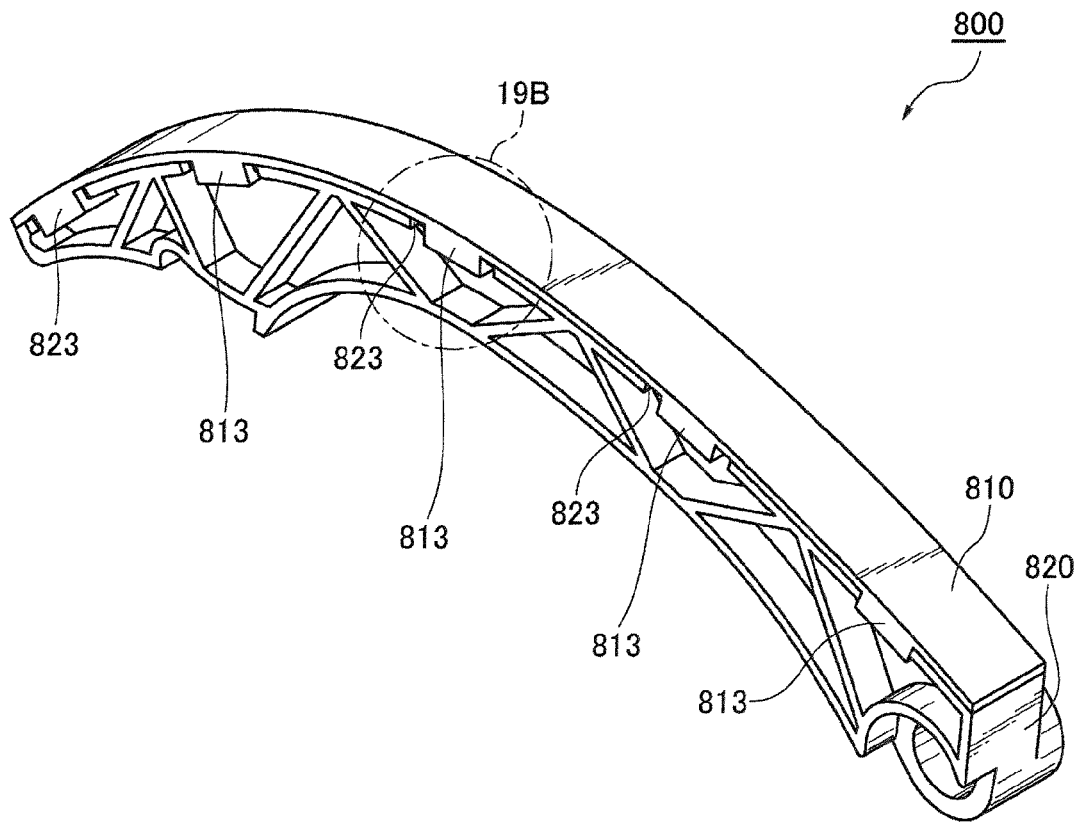
FIG. 19A is a perspective view of a conventional transmission guide.
Figure 19B:
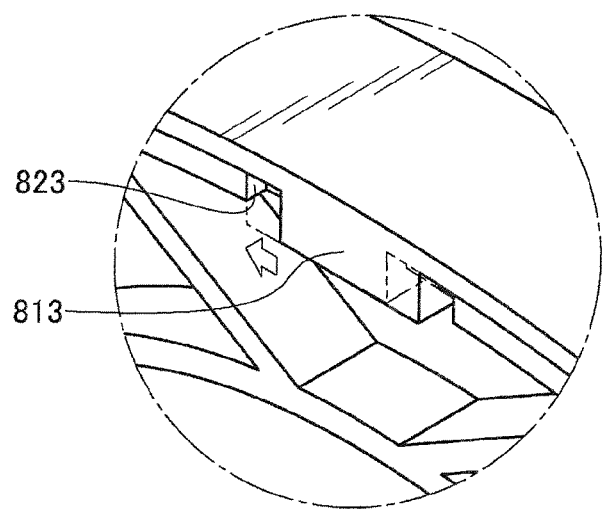
FIG. 19B is an enlarged view of a part of the transmission guide shown in FIG. 19A.
Figure 20:
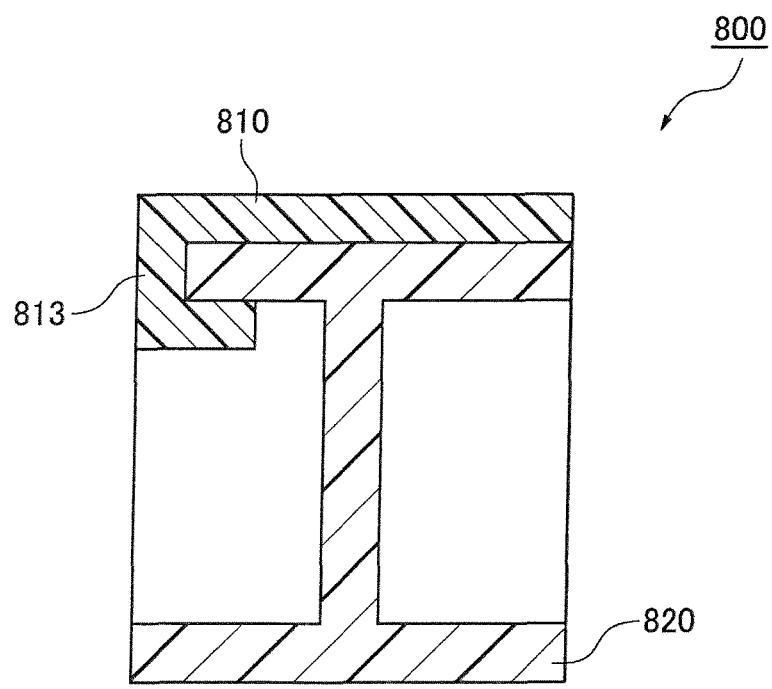
FIG. 20 is a transverse cross-sectional view of the transmission guide of FIGS. 19A and 19B.

In a seventh embodiment illustrated in FIG. 18, the movable guide 700 is similar to the movable guide of the first embodiment except that each of the projecting strips 721 has an L-shaped cross-section, in which a part extends laterally outward, in a direction of the width of the guide, toward an outer edge of the base.

The concave grooves 711 of the synthetic resin shoe 710 are also L-shaped, and conform in shape to, and receive, the L-shaped projecting strips. Here, as in the sixth embodiment, the shape of the strips and grooves helps to prevent the synthetic resin shoe from separating from the synthetic resin base. Accordingly, in addition to the effects of the movable guide of the first embodiment, the movable guide of the seventh embodiment more effectively avoids detachment of the back surface 710*b* of the synthetic resin shoe from the supporting surface 720*a* of the synthetic resin base.

The transmission guide according to the invention is produced by two member molding, wherein the back surface of the synthetic resin shoe is joined to a supporting surface of the synthetic resin base. Strips projecting from the supporting surface of the base and extending longitudinally in parallel, fit into, and are fused to, concave grooves formed on the synthetic resin shoe.

Integral molding of the synthetic resin shoe with the synthetic resin base simplifies assembly of the guide, improves the mutual bonding between the shoe and the base, and ensures reliable chain travel over a long time.

The invention can be embodied not only in a movable guide, but also in a stationary guide. The guide can be used with any of various kinds of transmission media such as roller chains, silent chains, and other endless, flexible, traveling transmission devices.

The two member molding process for integrally molding the transmission guide of the invention can be normal two member molding, so-called "two color" molding, or "sandwich" molding. In each case, primary injection molding can be carried out using a primary cavity and core to mold the synthetic resin base. The molded base is then taken out of the primary cavity and mounted in a secondary cavity, wherein secondary injection molding is carried out to mold the synthetic resin shoe. Alternatively, the shoe can be formed in a primary injection molding step, taken out of the primary cavity, and placed in a secondary cavity in which the synthetic resin base is formed by secondary injection molding.

With the two member molding process, it is easy to form the strips projecting from the supporting surface of the synthetic resin base and extending in parallel in the longitudinal direction of the guide, and the concave grooves in the synthetic resin shoe so that they receive, and are fused to, the projecting strips of the base.

The synthetic resin used for the transmission guide of the invention can be a synthetic resin such as polyamide or polybutylene terephthalate. The material of the synthetic resin shoe having is preferably a polyamide resin such as polyamide 6, polyamide 66, polyamide 46, or other resins, including aromatic resins, that exhibit a self-lubricant property. The base is preferably a reinforced polyamide resin containing glass fibers, exhibiting high strength and wear resistance.

The synthetic resin shoe can have any of various shapes as long as it has a sliding contact surface for sliding engagement with the link plates of a traveling transmission chain along its longitudinal direction. It is also preferable for the shoe to be formed with side walls projecting from its opposite edges in order to prevent the transmission chain from disengaging from the guide.

What is claimed is:

1. A transmission comprising a transmission chain having right and left sets of link plates and arranged to travel in a predetermined direction, and a guide for sliding engagement with said link plates of the chain, the guide comprising:

an elongated synthetic resin shoe having a front surface on which said link plates can slide and a back surface, and a synthetic resin base for supporting said shoe, said base being elongated along the direction of elongation of the shoe and having a supporting surface engaged with said back surface of the shoe, and said shoe and base being integrally molded by two member molding;

a pair of strips projecting from said supporting surface of the synthetic resin base and extending in parallel spaced relation to each other in the direction of elongation of the base; and a pair of concave grooves formed in the back surface of the synthetic resin shoe and extending in parallel to the direction of elongation of the shoe, each of said projecting strips of the base being received in, and fused to, one of said concave grooves formed in the back surface of the shoe, said grooves being positioned so that said right set of link plates of the chain slides on said front surface of the shoe at a location directly opposite one of said grooves of said pair and the left set of link plates of the chain slides on said front surface of the shoe at a location directly opposite the other of said grooves of said pair, and the thickness of the shoe, measured between the front surface and the back surface of the shoe at locations between said grooves, being greater than the thickness of the shoe measured between the front surface of the shoe and the part of each groove farthest from the back surface of the shoe.

2. The transmission according to claim 1, wherein at least one projecting strip of the synthetic resin base has an undercut shape in section, and the concave groove of the synthetic resin shoe in which said at least one projecting strip is received also has a shape in section conforming to said undercut shape of the projecting strip.

3. The transmission according to claim 1, wherein the concave grooves of the shoe and the projecting strips of the base have wedge-shaped, tapered, transverse cross-sections.

4. The transmission according to claim 1, wherein at least one of said concave grooves of the synthetic resin shoe and the projecting strip of the synthetic resin base received therein gradually widen in the direction of travel of said transmission chain.

5. The transmission guide according to claim 4, wherein at least one of said projecting strips on the synthetic resin base and the concave groove of the synthetic resin shoe receiving said at least one of said projecting strips are each composed of a repeating series of parts each of which gradually widens in the direction of travel of said transmission.

\* \* \* \* \*